Figure 1:
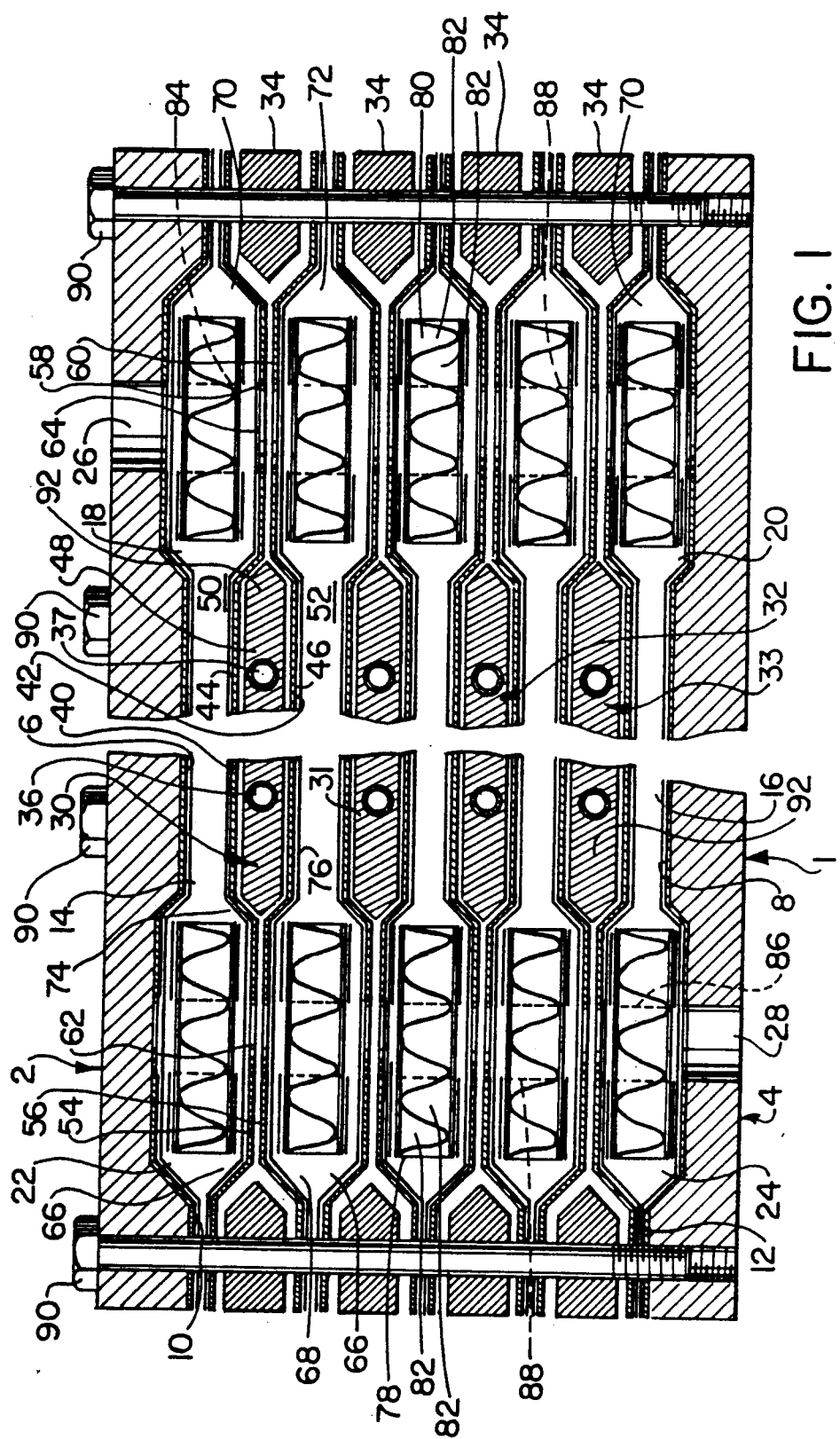

United States Patent [19]

Kutowy et al.

[11] Patent Number: 5,002,667

[45] Date of Patent: Mar. 26, 1991

[54] FLUID FRACTIONATING, STACKED PERMEABLE MEMBRANE ENVELOPE ASSEMBLY, AND A FLUID DISTRIBUTING AND PERMEABLE MEMBRANE SEALING COLLAR

[75] Inventors: Oleh Kutowy, North Gower; John D. Hazlett; Thomas W. McCracken, both of Orleans; Adam Bennett, Ottawa, all of Canada

[73] Assignee: National Research Council of Canada, Ottawa, Canada

[21] Appl. No.: 605,570

[22] Filed: Oct. 30, 1990

[51] Int. Cl.$^5$ .................. B01D 63/00; B01D 29/00
[52] U.S. Cl. .................. 210/321.75; 137/561 A; 210/321.84; 210/346; 210/456; 277/135
[58] Field of Search ............. 210/224, 321.75, 321.84, 210/295, 231, 221.85, 346, 460, 232, 486, 456; 137/561 A; 277/135

[56] References Cited

U.S. PATENT DOCUMENTS

| | | | |
|---|---|---|---|
| 3,494,469 | 2/1970 | Kohl et al. | 210/346 |
| 3,837,496 | 9/1974 | Hagstrom et al. | 210/321.75 |
| 3,841,491 | 10/1974 | Hagstrom et al. | 210/321.75 |
| 3,847,818 | 11/1974 | Madsen et al. | 210/321.84 |
| 3,872,015 | 3/1975 | Madsen | 210/321.84 |
| 4,631,130 | 12/1986 | Watanabe | 210/346 |
| 4,666,603 | 5/1987 | Madsen et al. | 210/456 |

Primary Examiner—W. Gary Jones
Assistant Examiner—Ana M. Fortuna
Attorney, Agent, or Firm—Francis W. Lemon

[57] ABSTRACT

A stacked permeable membrane envelope assembly comprises two clamping plates with spaced, permeable membrane envelope assemblies clamped between them on frames. Each membrane envelope comprises two membrane covered, perforated plates clamped together to provide inner permeate chambers and outer feed fluid passages. Fluid distributing and permeable membrane sealing collars are provided comprising two annular plates with a radially scalloped, stiff-spring-like, channel separator ring located between them. The annular plates seal the membranes against the dished plates around feed fluid passages through the envelope assemblies while the radial scallops form passages for fluid to flow between adjacent membrane envelopes.

11 Claims, 3 Drawing Sheets

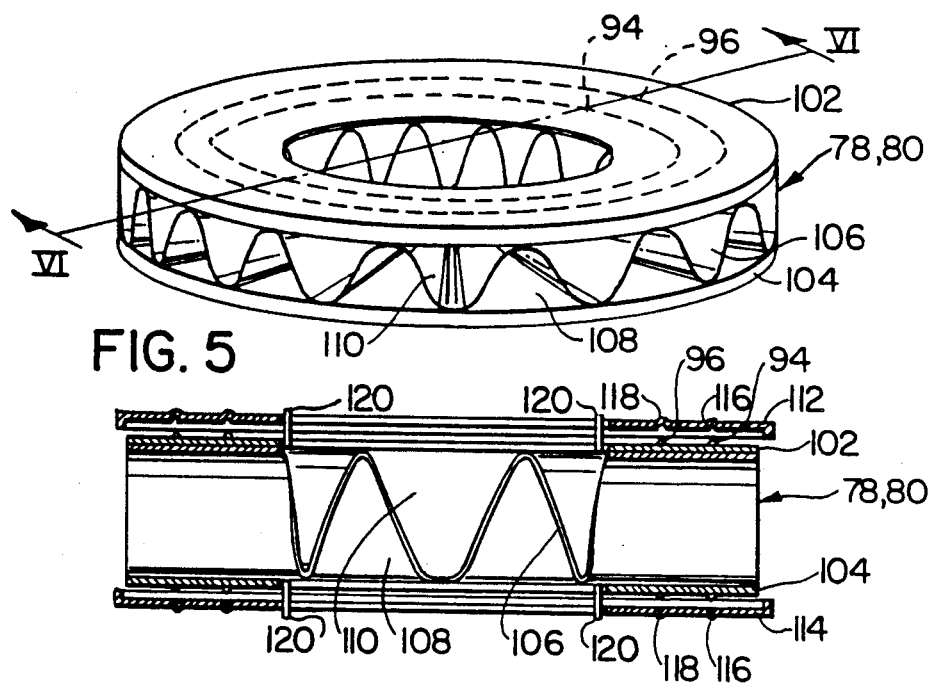
FIG. 5
FIG. 6
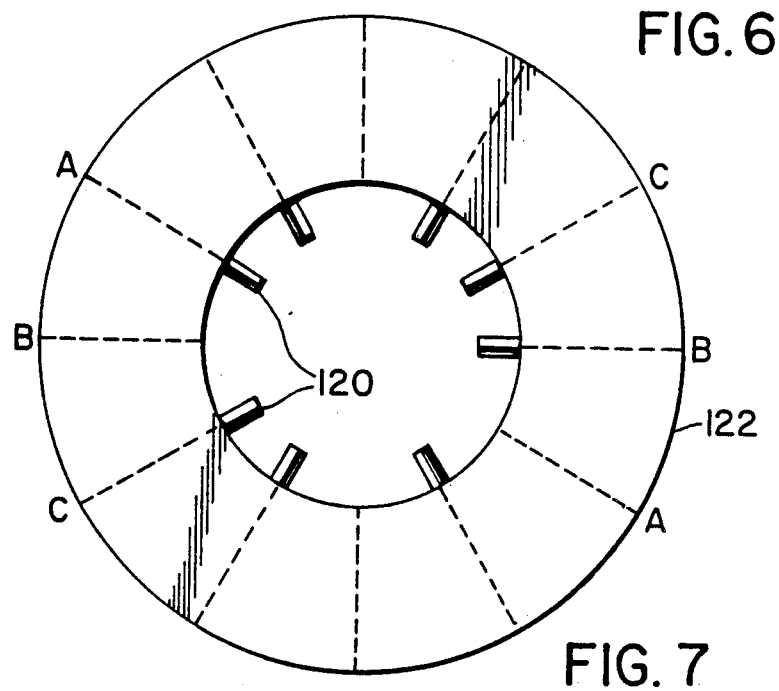
FIG. 7
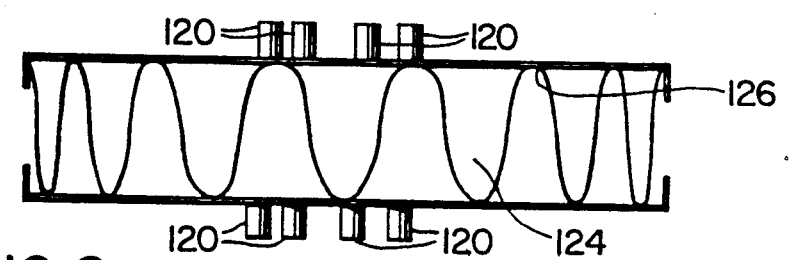
FIG. 8

FLUID FRACTIONATING, STACKED PERMEABLE MEMBRANE ENVELOPE ASSEMBLY, AND A FLUID DISTRIBUTING AND PERMEABLE MEMBRANE SEALING COLLAR

This invention relates to a fluid fractionating, stacked permeable membrane envelope assembly, and a fluid distributing and permeable membrane sealing collar.

It has already been proposed in U.S. Pat. No. 3,837,496, dated Sept. 24, 1974, O. Hagstrom and G. Riede, to provide a dialysis apparatus, particularly for purifying blood, which includes an assembly of flat supporting plates stacked together with pairs of membranes interposed between the sides of adjacent plates. These membranes form passageways between them for the liquid to be purified, and other passageways are formed between each plate and the adjacent membrane for circulating the purifying liquid. The assembly of supporting plates and membrane pairs are traversed by tubular shafts for the purifying liquid and these shafts include distributing disks which clamp the respective pairs of membranes to the adjacent support plate.

In the membrane fractionation of fluids, the largest flow rate by far is that of the liquid to be purified, and while the apparatus of Hagstrom and Riede is useful, circulating the purifying liquid between each plate and adjacent membrane reduces the space available for this purpose. Furthermore, the distributing disks of Hagstrom and Riede do not provide adequate fluid passage which causes back pressure problems in the stack.

It has also been proposed in U.S. Pat. Nos. 666,603, dated May 19, 1987, and 3,872,015, dated Mar. 18, 1975, R. E. Madson et al, to provide an apparatus for fractionating liquids into two fractions by reverse osmosis or ultrafiltration comprising a stack of alternating membranes and membrane supports, said stack having two spaced fluid holes extending through the stack. One of the fluid holes is an inlet and the other an outlet so that fluid flows parallel to the membrane surfaces from the inlet to the outlet.

While the apparatus of Madsen et al is useful in that a larger space is provided for the flow of the feed fluid, there are a number of features which do not make full use of the stack spaces, in that (i) the membrane supports are solid and rely on flutes in the surface thereof or the pores in filter paper on each side thereof to provide flow paths for the permeate, and (ii) the membrane supports are provided with curved ribs which press adjacent membranes together within narrow zones along which feed fluid flows so that the flow cross-sectional areas are narrow and restrict the direction of flow, together with unduly large permeable surface areas of the membranes being lost at the positions where the membranes are pressed together by the ridges.

There is a need for a fluid fractionating, stacked membrane envelope assembly wherein the feed fluid has an adequate and unrestricted flow path which is independent of the nature of the fluid being fractionated between the membrane envelopes and the support within the membrane envelopes provides an adequate escape path from the membranes for permeate.

Madsen et al provides sealing rings on clamping bolts or in the flow channels which hold the membranes and filter papers against their supports. When the sealing rings are around clamping bolts, they have a larger bore than the bolts to provide flow paths thereraround. The sealing rings have projections to hold the sealing rings apart for the flow of feed fluid between the membrane.

While these sealing rings are useful, there is a danger that they will only adequately seal the membranes at the positions where the projections exert pressure, and the flow paths created by the projections are unduly narrow.

There is also a need for a fluid permeable membrane, fluid distributing and sealing collar which will seal the membrane completely around the collar and which will provide more or less unrestricted radial flow from the collar to the membrane.

According to the present invention there is provided a fluid fractionating, stacked permeable membrane assembly, comprising:

(a) two clamping plates in spaced, face to face relationship with the facing surfaces of each plate having sealing rims bounding feed fluid recesses with inlet plenum recesses at facing first ends and outlet plenum recesses at facing second ends, a feed fluid inlet port to the inlet plenum recess of one plate, and a feed fluid outlet port from the outlet plenum recess of the other plate, (b) a stack of spaced permeable membrane envelopes between the plates, each membrane envelope comprising:

(i) a frame shaped to extend between the sealing rims and having permeate outlet means extending through the frame from the interior thereof, (ii) a pair of limited flexibility membrane support plates sealed to the frame, the pair of support plates being shaped to provide within that frame, intermediate, spaced, fluid permeable plate portions forming an inner permeate cavity between them, communicating with the permeate outlet means, and outer feed fluid recesses aligned with those in the plates, and at each end, adjacent plate portions having feed fluid passages therethrough and forming plenum recesses aligned with those in the plates, the feed fluid passages being aligned with the ports in the clamping plates, and (iii) for each support plate, a fluid permeable membrane covering the outer side of that spacer plate and having feed fluid passages aligned with the fluid passages in that support plate, (c) a plurality of membrane envelope spacer collars, each spacer collar having outwardly extending fluid passages therearound and each being arranged to compress, in a stiff-spring-like manner, a marginal edge portion of each membrane, around each fluid passage therein, against the support plate covered by that membrane, the spacer collars being for compression in:

(i) the plenum recesses in the clamping plates and the facing plenum recesses in the support plates adjacent to them, so that these spacer collars bound fluid passages between a clamping plate port and a support plate fluid passage, and (ii) the facing plenum recesses between support plates, so that these spacer collars bound fluid passages extending between support plate fluid passages, and (d) means for clamping the clamping plates, and the stack of envelopes between them, in a fluidtight manner so that the spacer collars clamp the said marginal edge portion of each of the membranes in fluidtight engagement with the support plate covered thereby.

In some embodiments of the present invention support means may be provided to support each membrane support plate against collapsing into the permeate cavity bounded thereby.

The support means may be an open mesh filling in each permeate cavity.

Annular sealing ridges may be provided on each spacer collar to seal each membrane, around the fluid passage, against the membrane support covered thereby.

The plenum recesses may be elongated to extend along each end of the feed fluid recesses, the fluid inlet and outlet ports may each be one of a plurality of similar fluid ports spaced along their respective plenum recesses, the fluid passages may each be one of a plurality of similar fluid passages through the membrane supports and the membranes and the spacer collars may each be one of a plurality of similar spacer collars provided for each fluid passage.

Each membrane support plate may be shaped to have stiffening ridges extending along the feed fluid recesses.

Further, according to the present invention there is provided a fluid distributing and permeable membrane sealing collar, comprising:

(a) two coaxial, spaced, annular plates, and
(b) a radially scalloped, stiff-spring-like, separator ring located between the spaced annular plates to provide radially extending fluid passages therebetween.

The collar may further comprise flat membrane sealing washers adjacent each of the annular plates, and sealing washer locating means for locating the sealing washers coaxially on the annular plate adjacent thereto.

The sealing washer locating means may comprise upstanding tabs on the collar which locate in the bore of the sealing washer adjacent thereto.

The sealing washer may be provided with annular, membrane sealing ridges extending around an exposed side thereof.

Each annular plate and separator ring is preferably of high strength steel.

Figure 2:
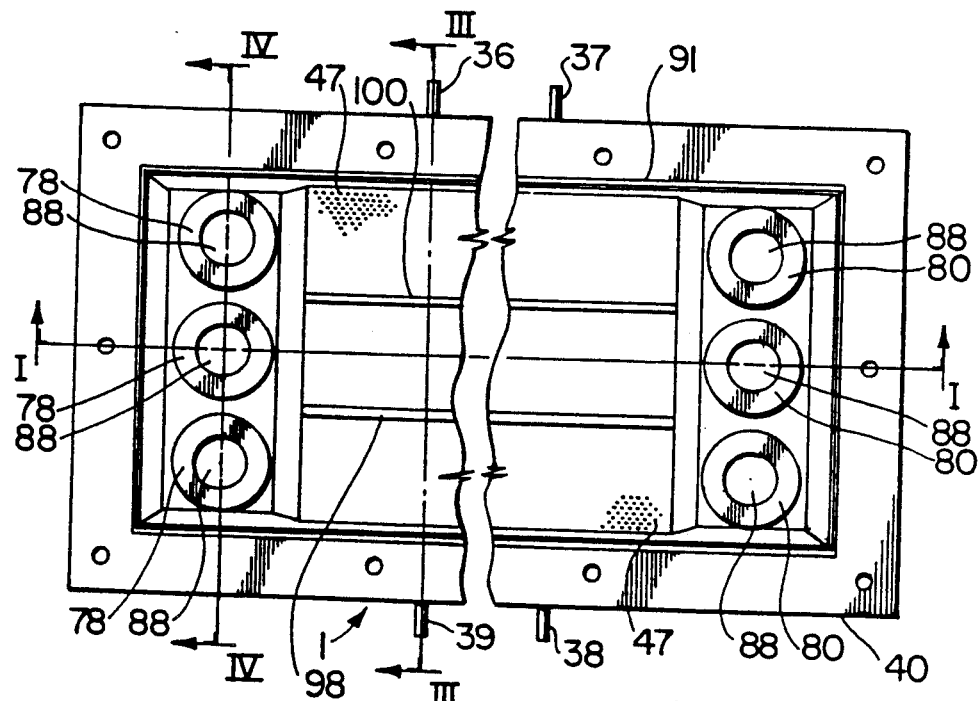
Figure 3:
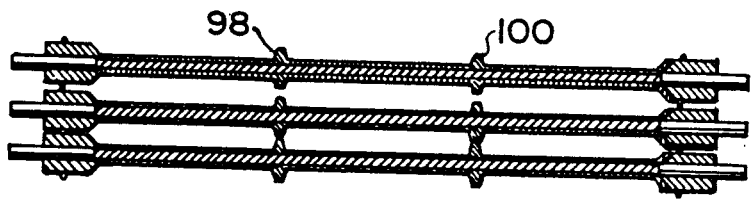
Figure 4:
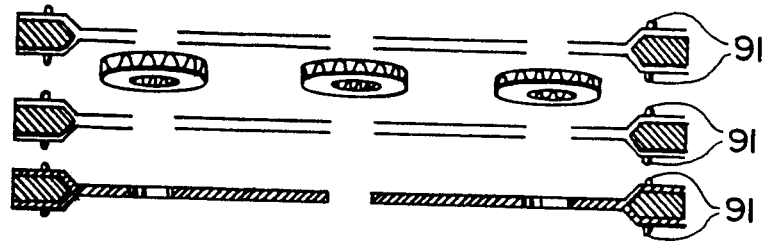

In the accompanying drawings which illustrate, by way of example, an embodiment of the present invention;

FIG. 1 is a partly sectioned, exploded, side view along I—I, FIG. 2, of an end portion of a fluid fractionating, stacked permeable membrane envelope assembly, FIG. 2 is a plan view of the assembly shown in FIG. 1, with the top clamping plate and the clamping bolts removed, FIG. 3 is a diagrammatic, sectional end view along III—III, FIG. 2, of a membrane envelope portion of the assembly, FIG. 4 is a diagrammatic, sectional end view along IV—IV, FIG. 2, of a spacer collar portion of the assembly, FIG. 5 is a perspective view of a collar, FIG. 6 is a sectional side view through the centerline of a collar and the sealing washers adjacent to it, FIG. 7 is a plan view of a blank for making a radially scalloped, substantially rigid channel separating ring portion of a collar, and FIG. 8 is a side view of the blank shown in FIG. 7, shaped to be radially scalloped (fitted with annular plates).

Referring now to FIGS. 1 to 4, there is shown a fluid fractionating, stacked permeable membrane assembly, generally designated 1, comprising:

(a) two clamping plates 2 and 4 in spaced, face to face relationship with the facing surfaces, 6 and 8 respectively, of each plate 2 and 4 having sealing rims, 10 and 12 respectively, bounding feed fluid recesses, 14 and 16 respectively, with inlet plenum recesses 18 and 20 respectively at facing first ends and outlet plenum recesses, 22 and 24 respectively, at facing second ends, a feed fluid inlet port 26 to the inlet plenum recess 18 of the plate 2, and a feed fluid outlet port 28 from the outlet plenum recess 24 of the plate 4, (b) a stack of spaced permeable membrane envelopes generally designated 30 to 33 between the plates 2 and 4, each membrane envelope 30 to 33 comprising:
  (i) a frame 34 shaped to extend between the sealing rims 10 and 12 and having permeate outlet means, in the form of tubes 36 to 39, FIGS. 1 and 2, extending through the frame 34 from the interior thereof,
  (ii) a pair of limited flexibility membrane support plates 40 and 42 sealed to the frame 34, the pair of support plates 40 and 42 being shaped to provide within that frame 34, intermediate, spaced, fluid permeable plate portions 44 and 46, having perforations 47, FIG. 2, and forming an inner permeate cavity 48 between them, communicating with the permeate outlet tubes 36 to 39, and outer feed fluid recesses 50 and 52 aligned with those in the plates 2 and 4, and at each end, adjacent plate portions 54, 56 and 58, 60 having feed fluid passages, 62 and 64 respectively, therethrough and forming plenum recesses 66, 68 and 70, 72 respectively, aligned with those designated 22, 24 and 18, 20 respectively, in the plates 2 and 4, the feed fluid passages 62 and 64 being aligned with the ports 28 and 26 respectively, in the clamping plates 2 and 4, and (iii) for each support plate 40 and 42, a fluid permeable membrane, 74 and 76 respectively, covering the outer side of that support plate and having feed fluid passage aligned with the fluid passages 62 and 64 in that support plate 40 or 42, (c) a plurality of membrane envelope spacer collars, such as those designated 78 and 80, each spacer collar 78, 80 having outwardly extending fluid passages, such as those designated 82, therearound and each being arranged to compress, in a stiff-spring-like manner, a marginal edge portion of each membrane 74 and 76, around each fluid passage therein, against the support plate 40 or 42 covered by that membrane 74 or 76, the spacer collars 78, 80 being for compression in:
  (i) the plenum recesses 18, 20, 22 and 24 in the clamping plates 2 and 4 and the facing plenum recesses 66, 68, 70 and 72 in the support plates adjacent to them, so that one of these spacer collars 78, 80 bounds a fluid passage 84, 86 between a clamping plate port 26 and 28 respectively and a support plate fluid passage, 64 and 62 respectively, and
  (ii) the facing plenum recesses 66, 68 and 70, 72 between support plates 40 and 42 so that these spacer collars 78, 80 bound fluid passages 88 extending between support plate fluid passages 62 and 74, and (d) means, in the form of bolts 90, for clamping the clamping plates 2 and 4, and the stack of envelopes 30 to 33 between them, in a fluidtight manner so that the spacer collars, such as those designated 78 and 80, clamp the said marginal edge portions of each of the membranes 74 and 76 in fluidtight engagement with the support plates 40 or 42 covered thereby.

Membrane sealing ridges, such as ridge 91 (FIG. 2) may be provided extending around each membrane support plate 40 or 42. The sealing ridges 91 may be replaced by sealing rings.

In this embodiment of the present invention, support means, each in the form of an open wire mesh filling 92, are provided to support each membrane support plate 40 and 42 against collapsing into the permeate cavity 48 bounded thereby.

As shown in FIGS. 5 and 6, annular sealing ridges 94 and 96 may be provided on each spacer collar 78 and 80 to seal each membrane, around the fluid passage, against the membrane support covered thereby.

As shown in FIGS. 2 to 4, the plenum recesses 22, 24, 66, 68, 70 and 72 are elongated to extend along each end of the feed fluid recesses 50 and 52, the fluid inlet and outlet ports, 26 and 28 respectively, are each one of a plurality of similar fluid ports spaced along their respective plenum recesses, the fluid passages 62 and 64 are each one of a plurality of similar fluid passages through the membrane supports and the membranes, and the spacer collars 78 and 80 are each one of a plurality of similar spacer collars provided for each fluid passage 62 and 64 respectively.

Each membrane support plate may be shaped to have stiffening ridges 98 and 100 extending along the feed fluid recesses 50 and 52.

As shown in FIGS. 5 and 6, each collar 78, 80 is a fluid distributing and membrane sealing collar and comprises:
(a) two coaxial, spaced, annular plates 102 and 104, and
(b) a radially scalloped, stiff-spring-like, separator ring 106 located between the spacer collars 102 and 104 to provide radially extending fluid passages, such as those designated 108 and 110, therebetween.

If desired, flat membrane sealing washers, 112 and 114, may be provided adjacent the annular plates 102 and 104 respectively, and sealing washer locating means such as, hollow, annular, membrane sealing ridges 116 and 118 may be provided for locating the sealing washers 112, 114 coaxially on the annular plate 102 or 104 adjacent thereto. The hollow ridges 116 and 118, reinforced by the ridges 94 and 96, enhance the membrane seal.

If the ridges 94 and 96 are not provided, then the sealing washer locating means may comprise upstanding locating tabs 120 on each scalloped separator ring 106.

As shown in FIGS. 7 and 8, the radially scalloped, stiff-spring-like, channel separator ring 106 may be shaped from a blank 122 about radially extending lines, such as AA, BB, CC etc., to provide radially extending, rounded, corrugation valleys 124 and ridges 126. The blank 122 may contain the locating tabs, With the apparatus arranged as shown in FIGS. 1 and 2, the clamping plates 2 and 4, and membrane envelopes 30 to 33, are clamped together in a fluidtight manner, and the collars 78 and 80 are clamped to the membranes 74 and 76 in a fluidtight manner against the membrane support plates 40 and 42 respectively, by the bolts 90.

A feed fluid is fed under pressure to the fluid inlet ports 26 and is distributed by the collars 78 to flow along the recesses 50 and 52 and out of the port 28. As the feed fluid flows along the recesses 50 and 52, permeate of the feed liquid permeates the membranes 74 and 76 and flows along the cavities 48 and exits through the tubes 36 to 39.

Preferably, each plate 102 or 104, and each separator ring 106, are made of high strength steel, e.g. stainless steel.

We claim:

1. A fluid fractionating, stacked permeable membrane assembly, comprising:
   (a) two clamping plates in spaced, face to face relationship with the facing surfaces of each plate having sealing rims bounding feed fluid recesses with inlet plenum recesses at facing first ends and outlet plenum recesses at facing second ends, a feed fluid inlet port to the inlet plenum recess of one plate, and a feed fluid outlet port from the outlet plenum recess of the other plate,
   (b) a stack of spaced permeable membrane envelopes between the plates, each membrane envelope comprising:
      (i) a frame shaped to extend between the sealing rims and having permeate outlet means extending through the frame from the interior thereof,
      (ii) a pair of limited flexibility membrane support plates sealed to the frame, the pair of support plates being shaped to provide within that frame: intermediate, spaced, fluid permeable plate portions forming an inner permeate cavity between them, communicating with the permeate outlet means, and outer feed fluid recesses aligned with those in the plates, and at each end, adjacent plate portions having feed fluid passages therethrough and forming plenum recesses aligned with those in the plates, the feed fluid passages being aligned with the ports in the clamping plates, and
      (iii) for each support plate, a fluid permeable membrane covering the outer side of that support plate and having feed fluid passages aligned with the fluid passages in that spacer plate,
   (c) a plurality of membrane envelope spacer collars, each spacer collar having outwardly extending fluid passages therearound and each being arranged to compress, in a stiff-spring-like manner, a marginal edge portion of each membrane, around each fluid passage therein, against the support plate covered by that membrane, the spacer collars being for compression in:
      (i) the plenum recesses in the clamping plates and the facing plenum recesses in the support plates adjacent to them, so that these spacer collars bound fluid passages between a clamping plate port and a support plate fluid passage, and
      (ii) the facing plenum recesses between support plates, so that these spacer collars bound fluid passages extending between support plate fluid passages, and
   (d) means for clamping the clamping plates, and the stack of envelopes between them, in a fluidtight manner so that the spacer collars clamp the said marginal edge portion of each of the membranes in fluidtight engagement with the support plate covered thereby.

2. An assembly according to claim 1, wherein support means are provided to support each membrane support plate against collapsing into the permeate cavity bounded thereby.

3. An assembly according to claim 2, wherein the support means is a mesh filling in each permeate cavity.

4. An assembly according to claim 1, wherein annular sealing ridges are provided on each spacer collar to seal each membrane, around the fluid passage, against the membrane support covered thereby.

5. An assembly according to claim 1, wherein the plenum recesses are elongated to extend along each end of the feed fluid recesses, the fluid inlet and outlet ports are each one of a plurality of similar fluid ports spaced along their respective plenum recesses, the fluid passages are each one of a plurality of similar fluid passages through the membrane supports and the membranes and the spacer collars are each one of a plurality of similar spacer collars provided for each fluid passage.

6. An assembly according to claim 5, wherein each membrane support plate is shaped to have stiffening ridges extending along the feed fluid recesses.

7. A fluid distributing and permeable membrane sealing collar, comprising:

(a) two coaxial, spaced, annular plates, and (b) a radially scalloped, stiff spring like, separating ring located between the spaced, annular plates to provide radially extending fluid passages therebetween.

8. A collar according to claim 7, further comprising flat membrane sealing washers adjacent each of the annular plates, and sealing washer locating means for locating the sealing washers coaxially on the annular plate adjacent thereto.

9. A collar according to claim 8, wherein the sealing washer locating means comprises upstanding tabs on the collar which locate in the bore spacer plate of the sealing washer adjacent thereto.

10. A collar according to claim 7, wherein the sealing washer is provided with annular, membrane sealing ridges extending around an exposed side thereof.

11. A collar according to claim 7, wherein each annular plate and separator ring are of high strength steel.

* * * * *